US006360536B1

(12) United States Patent
Prabhu et al.

(10) Patent No.: US 6,360,536 B1
(45) Date of Patent: Mar. 26, 2002

(54) CONTROL SYSTEM FOR A HYDRAULIC TRANSFORMER

(75) Inventors: Sameer M. Prabhu, Clayton; Satyendra Singh, Cary, both of NC (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/268,922

(22) Filed: Mar. 16, 1999

(51) Int. Cl.[7] .......... F16D 31/02
(52) U.S. Cl. .......... 60/419
(58) Field of Search .......... 60/419; 417/225, 417/348, 271

(56) References Cited

U.S. PATENT DOCUMENTS 4,707,988 A 11/1987 Palmers
4,924,671 A 5/1990 Reinert
4,974,994 A 12/1990 Kirstein et al.
5,251,442 A * 10/1993 Roche .......... 60/419
5,460,084 A 10/1995 Otremba et al.
5,473,893 A 12/1995 Achten et al.
5,499,525 A 3/1996 Kordak et al.
5,852,933 A 12/1998 Schmidt
5,878,569 A * 3/1999 Satzler .......... 60/419

FOREIGN PATENT DOCUMENTS

DE 3805290 A1 6/1998
WO 97/31185 8/1997
WO WO 98/54450 12/1998
WO WO-98/54468 * 12/1998 .......... 60/419

OTHER PUBLICATIONS

Achten, et al., Transforming Future Hydraulics: A New Design Of A Hydraulic Transformer.
Geschwindigkeitssteuerung eines Zylinder am Konstantdrucknetz durch einen Hydro–Transformer; vol. 29, No. 4, 1985 pp. 281–286; XP000882983.
Zlindersteuerung am Drucknetz durch Hydro–Transformatoren; vol. 31, No. 3, 1987 pp. 250–254 –XP000882982.

* cited by examiner

*Primary Examiner*—F. Daniel Lopez
(74) *Attorney, Agent, or Firm*—Taylor & Aust, P.C.

(57) ABSTRACT

A control system for a hydraulic transformer has a hydraulic system for providing hydraulic pressure to the hydraulic transformer, a controller connected to the hydraulic transformer, the controller for determining the input pressure provided to the hydraulic transformer and for controlling the operation of the hydraulic transformer based upon input pressure provided to the hydraulic transformer.

16 Claims, 2 Drawing Sheets

CONTROL SYSTEM FOR A HYDRAULIC TRANSFORMER

TECHNICAL FIELD

This invention relates generally to control system for a hydraulic system, and more particularly, to a control system for a hydraulic system having a hydraulic transformer.

BACKGROUND ART

Hydraulic transformers are useful devices in a hydraulic circuit or system. A hydraulic transformer is a hydraulic power transmission and regulation device which is used in hydraulic systems or circuits. A hydraulic transformer provides pressure and flow energy transformations within the hydraulic circuit. Unlike valves, which only provide pressure reductions by throttling the flow through an orifice which incurs energy losses, the hydraulic transformer can provide an increase or decrease in pressure with corresponding increase or decrease in output flow. This is accomplished without incurring significant energy losses. Hydraulic transformers are typically used in conjunction with constant or known supply pressure as a source of power. The power source may be driven by any of a variety of prime movers such as a diesel engine, gasoline engine, piston or rotary engine, or an electric motor. The hydraulic transformers also need a hydraulic pumping device in conjunction with some type of pressure regulation system to provide the hydraulic transformers with a predetermined or constant supply pressure. This usually involves some other components such as hydraulic accumulators, pressure reducing valves, and variable displacement pumps with pressure compensation. In this manner, pump flow is adjusted to provide a constant known output pressure simultaneously with matching the output flow to the time varying demands of the hydraulic transformer connected to the hydraulic power source.

The functioning of the hydraulic transformer can be explained by an equivalent system consisting of a fixed or variable displacement motor connected to a fixed or variable displacement pump with at least one of these devices being variable or adjustable through some external means of control. The motor and pump can be two physically separate components interconnected with a shaft or can share the same pumping element. The hydraulic transformer may also have a port plate which used three fluid passages or ports. The displacements of the motor and the pump may be varied by changing the angle of the rotatable port plate. The pump and motor displacements can be related to each other and this relationship is a function of the angle of the port plate. The motor or inlet side of the hydraulic transformer can be connected to a constant pressure fluid power source possibly employing an accumulator or other means for maintaining constant supply pressure. The output or pump part of the hydraulic transformer is used to drive a hydraulic circuit, such as the propulsion, steering, or implement circuits found in an earthmoving machine. In essence, the hydraulic transformer is a three port device which transforms an input flow and pressure (i.e., power) into a different output flow and corresponding output pressure as a function of the pump and motor displacement ratio. The hydraulic transformer is capable of maintaining the same power level as at the input of the hydraulic transformer, except for mechanical losses in the hydraulic transformer. The third port, connected to the reference pressure point, provides the additional flow required at the output or bypasses the excess flow at the input, as is required by the transformation conditions. The transformation ratio between the input pressure or flow and the output pressure or flow of the hydraulic transformer depends on the effective displacement ratio between the input and the output which is controlled by the angle of the port plate within the hydraulic transformer.

In using a hydraulic transformer as a power transmission element in a hydraulic circuit it is important to require that the power output of the hydraulic transformer satisfy the demands of all the hydraulic circuits or loads connected to the hydraulic transformer. The hydraulic transformer also needs to provide stable and responsive performance under varying load conditions. When an accumulator is used at the input of the hydraulic transformer to provide a constant supply pressure, it is possible for the accumulator to bleed down, i.e., operate at reduced pressure, in order to maintain the required flow or instantaneous power. This occurs when the momentary power demand at the output exceeds what the energy is being supplied to the hydraulic transformer. Bleed down is a significant concern in the operation of a hydraulic transformer since the accumulator needs to be charged up to the standard system pressure prior to further system operations proceeding in a normal manner.

Another significant problem which arises with the use of a hydraulic transformer is due to the vary nature of its operation as a power transformation device. Depending on the size of the volumes and their effective compressibilities, sustained oscillations can be generated in the input and the output flow and pressure due to the interaction between the two volumes within the hydraulic transformer. Under extreme conditions, such oscillations can cause catastrophic component damage or failure. Additionally, such oscillations can cause operational difficulties in power transmission. Hence, such oscillations need to be eliminated to allow for acceptable functioning of the hydraulic transformer in most realistic applications. Further, providing against oscillations will permit the stable delivery of hydraulic power without excessive acoustical or noise generation within a hydraulic circuit.

Accordingly, the present invention is directed to overcoming one or more of the problems as set forth above.

DISCLOSURE OF THE INVENTION

In one aspect of the present invention, a hydraulic transformer provides hydraulic pressure to a fluid actuator, a control system has a hydraulic system for providing hydraulic pressure to the hydraulic transformer, a controller connected to the hydraulic transformer, the controller for determining the input pressure provided to the hydraulic transformer and for controlling the operation of the hydraulic transformer based upon input pressure provided to the hydraulic transformer.

In another aspect of the present invention, a control system has a hydraulic system for providing hydraulic pressure to the hydraulic transformer, a controller connected to the hydraulic transformer, the controller for determining the output pressure provided to the fluid actuator from the hydraulic transformer and for controlling the operation of the hydraulic transformer based upon output pressure.

BEST MODE FOR CARRYING OUT THE INVENTION

Figure 1:
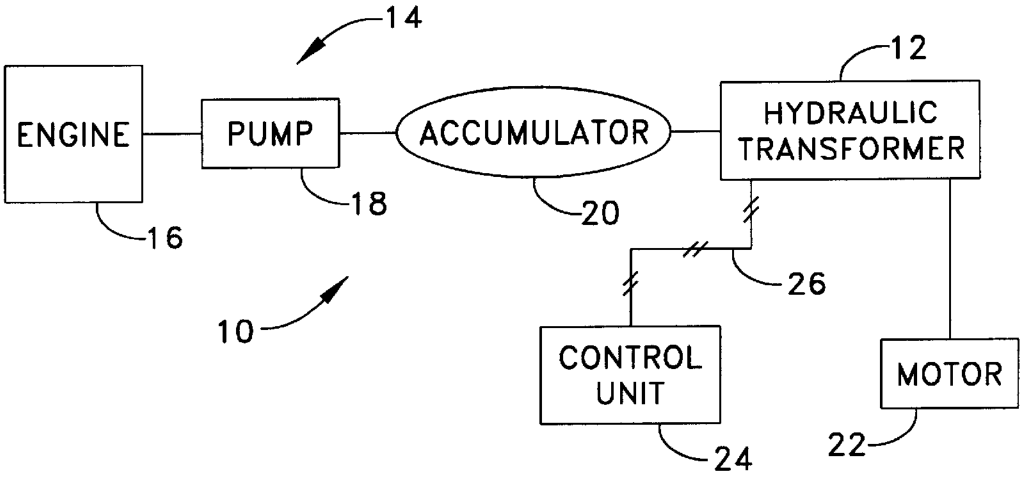
FIG. 1 is a block diagram of a control system for a hydraulic transformer constructed according to the present invention.

Referring now to the drawings, FIG. 1 illustrates a control system 10 for a hydraulic transformer 12 constructed according to the present invention. A hydraulic system 14 is connected to the hydraulic transformer 12 to provide a supply of pressure or hydraulic fluid to the hydraulic transformer 12. The hydraulic system 14 consists of an engine 16 which is coupled to a pump 18. The engine 16 may be controlled by an operator using an operator input (not shown) such as for example a throttle. The pump 18 serves to supply pressure or hydraulic fluid to an accumulator 20 which is connected to the hydraulic transformer 12. A motor 22, which is an example of a fluid actuator or a load circuit, is connected to the hydraulic transformer 12.

A controller or control unit 24 is electrically connected to the hydraulic transformer 12 by an electrical lead 26. The control unit 24 may include a microprocessor, a microcontroller, or any other suitable electronic circuit or integrated chip. The control unit 24 is used to control the flow demand from the hydraulic transformer 12 to the flow produced by the hydraulic system 14. As the speed of the engine 16 changes in response to the operator input or the load of the motor 22, the flow produced at the output of the pump 18 also changes directly in proportion to the speed of the engine 16. In order to control the flow from the hydraulic transformer 12 the control system 10 monitors the input to the hydraulic transformer 12. The control system 10 ensures that the output power of the hydraulic transformer 12 satisfies the demand of the motor 22 or any other circuit or load connected to the hydraulic transformer 12.

In operation of the control system 10, an operator controls the operator input by actuating the input to any desired speed. The engine 16 then operates the pump 18 which provides a supply of hydraulic fluid to accumulator 20 and then to the hydraulic transformer 12. Once the hydraulic transformer 12 is provided with hydraulic fluid the hydraulic transformer 12 operates the motor 22. The control unit 24 is monitoring the hydraulic transformer 12 in order to determine whether the hydraulic transformer 12 needs to be adjusted to either increase or decrease the hydraulic fluid provided to the motor 22. As is known, hydraulic fluid from the hydraulic transformer 12 may be controlled by adjusting a port plate (not shown) within the hydraulic transformer 12. Movement of the port plate is effective to control the volume of fluid being delivered from the hydraulic transformer 12 to the motor 22.

Figure 2:
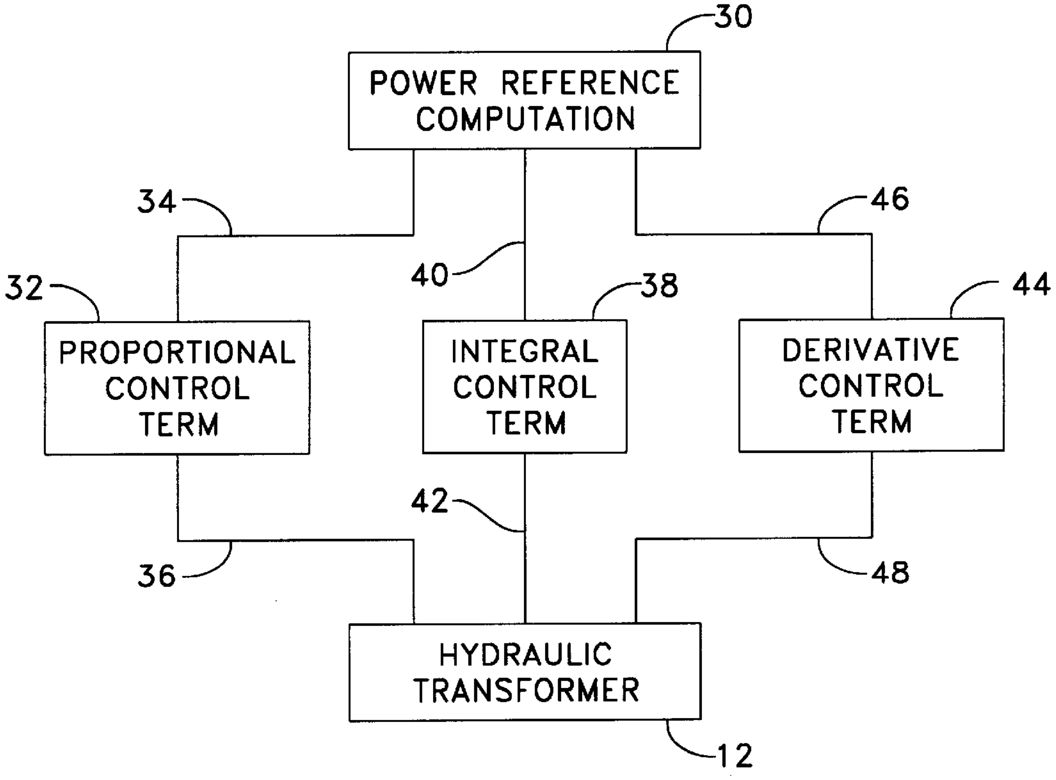
FIG. 2 is a detailed block diagram of the control system for a hydraulic transformer constructed according to the present invention.

Referring now to FIG. 2, a block diagram of the control unit 24 for controlling the operation of the hydraulic transformer 12 is shown. The control unit 24 includes a power reference computation unit 30 which is used to determine the reference power at the input of the hydraulic transformer 12 such that the demand of the motor 22 at the output of the hydraulic transformer 12 is satisfied. The power reference computation can encompass a constant power reference or a complex computation which accounts for the dynamics of the motor 22. The computation required may involve the use of a sensor, such as sensing the pressure at the load or the motor 22, or could be based on variables already known to the control unit 24 such as the displacement ratio of the hydraulic transformer 12, input pressure to the hydraulic transformer 12, or rotational speed.

The power reference computation unit 30 is connected to a proportional control term unit 32 via a lead 34. The input to the proportional control term unit 32 is the difference between the computed power reference which was determined by the power reference computation unit 30 and the actual value of the power at the input of the hydraulic transformer 12. The proportional control term unit 32 acts on the error between the reference power signal and the actual power at the input of the hydraulic transformer 12. The proportional control term unit 32 is connected to the hydraulic transformer 12 via a lead 36. The output of the proportional control term unit 32 is provided to the hydraulic transformer 12 to control the displacement ratio of the hydraulic transformer 12. This output is proportional to the error in the input power of the hydraulic transformer 12. For example, the hydraulic transformer 12 has a movable port plate (not shown) and the output of the proportional control term unit 32 will move the port plate. This movement will ensure a rapid response in situations where the output power demand of the hydraulic transformer 12 changes due to changes in the motor 22 or the load circuit. Such changes could be for example due to sudden obstruction of the flow in the motor 22 which would necessitate an increase in pressure in the control system 10 to overcome the obstruction to the flow. The proportional control term unit 32 would provide a signal over the lead 36 to change the angle of the port plate in the hydraulic transformer 12 to allow the pressure at the output of the hydraulic transformer 12 to be increased. The proportional control term unit 32 serves the purpose of ensuring a rapid response to large scale changes in the motor 22 or the load circuit.

The power reference computation unit 30 is also connected to an integral control term unit 38 by an electrical lead 40. The input to the integral control term unit 38 is the difference between the computed power reference which was determined by the power reference computation unit 30 and the actual value of the power at the input of the hydraulic transformer 12. The integral control term unit 38 acts on the error between the reference power signal and the actual power to provide an input over the lead 42 to the input of the hydraulic transformer 12. This input controls the angle of the port plate within the hydraulic transformer 12. The integral control term unit 38 ensures a zero steady state error in the power input to the hydraulic transformer 12. The integral control term unit 38 also prevents bleed down of the accumulator 20 by maintaining the power input into the hydraulic transformer 12 close to the reference value.

The power reference computation unit 30 is further connected to a derivative control term unit 44 by a lead 46. The derivative control term unit 44 acts on the actual power input to the hydraulic transformer 12 to change the angle of the port plate within the hydraulic transformer 12. The derivative control term unit 44 is able to control the hydraulic transformer 12 by sending a signal over a lead 48 which connects the derivative control term unit 44 to the hydraulic transformer 12. The derivative control term unit 44 is used to anticipate the operation of the hydraulic transformer 12. More importantly, the derivative control term unit 44 introduces a phase lead into the hydraulic transformer 12 which is used to control small oscillations in the angle of the port plate of the hydraulic transformer 12. This eliminates flow or pressure oscillations at the input and the output of the hydraulic transformer 12 which also helps to eliminate any speed oscillations within the hydraulic transformer 12. The derivative control term unit 44 performs the task of active cancellation of pressure and flow oscillations which may occur within the hydraulic transformer 12.

Figure 3:
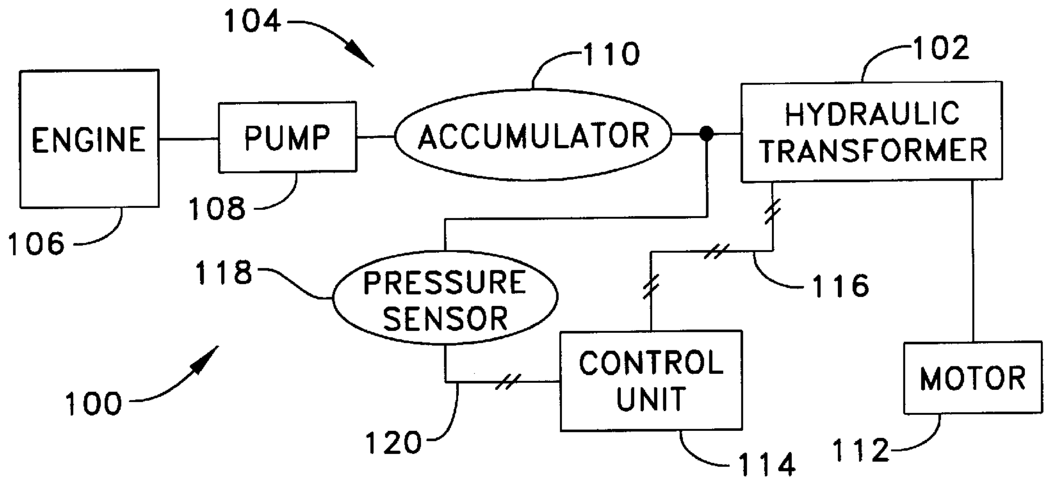
FIG. 3 is a block diagram of another embodiment of a control system for a hydraulic transformer constructed according to the present invention.

FIG. 3 illustrates a control system 100 for a hydraulic transformer 102 in which the input power provided to the hydraulic transformer 102 is monitored in order to control the operation of the hydraulic transformer 102. The control system 100 includes a hydraulic system 104 is connected to the hydraulic transformer 102 to provide a supply of pressure or hydraulic fluid to the hydraulic transformer 102. The hydraulic system 104 consists of an engine 106 which is coupled to a pump 108. The engine 106 may be controlled by an operator using an operator input (not shown) such as for example a throttle. The pump 108 serves to supply pressure or hydraulic fluid to an accumulator 110 which is connected to the hydraulic transformer 102. A motor 112, which is an example of a fluid actuator or a load circuit, is connected to the output of the hydraulic transformer 102. A controller or control unit 114 is electrically connected to the hydraulic transformer 102 by an electrical lead 116. A pressure sensor 118 is connected between the accumulator 110 and the input to the hydraulic transformer 102 to sense the pressure being supplied to the hydraulic transformer 102. The sensor 118 is connected to the control unit 114 via a lead 120. The sensor 118 provides the sensed pressure to the control unit 114 over the lead 120. In this manner, the control unit 114 is able to monitor the input to the hydraulic transformer 102 to control the operation of the hydraulic transformer 102.

Figure 4:
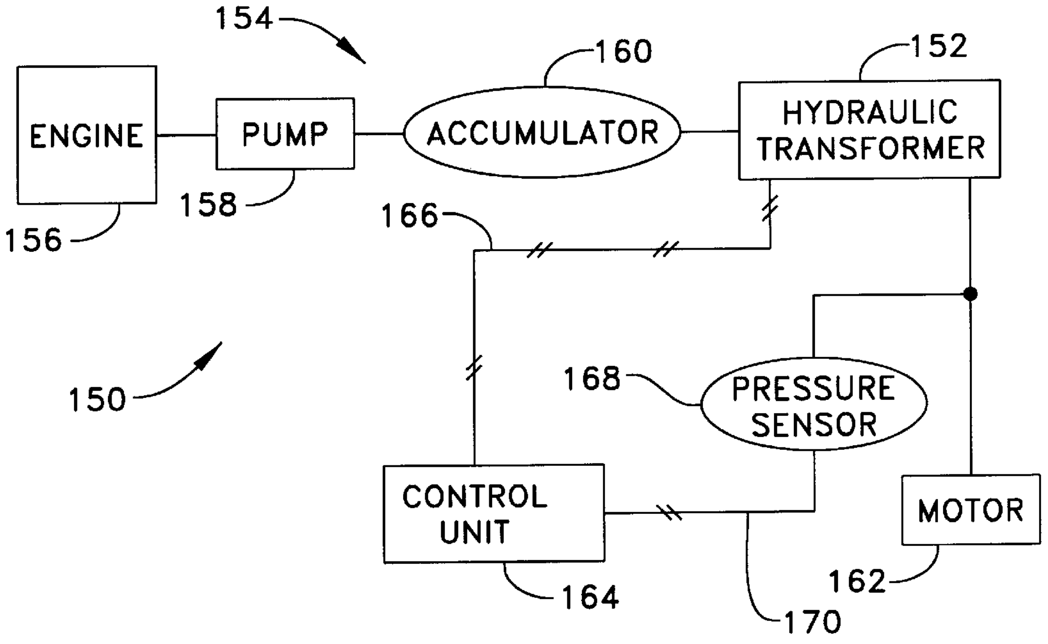
FIG. 4 is block diagram of a further embodiment of a control system for a hydraulic transformer constructed according to the present invention.

With reference now to FIG. 4, another embodiment of a control system 150 for a hydraulic transformer 152 is shown. The control system 150 monitors the output of the hydraulic transformer 152 in order to control the operation of the hydraulic transformer 152. The control system 150 includes a hydraulic system 154 which is connected to the hydraulic transformer 152 to provide a supply of pressure or hydraulic fluid to the input of the hydraulic transformer 152. The hydraulic system 154 consists of an engine 156 which is coupled to a pump 158. The engine 156 may be controlled by an operator using an operator input (not shown) such as for example a throttle. The pump 158 serves to supply pressure or hydraulic fluid to an accumulator 160 which is connected to the hydraulic transformer 152. A motor 162, which is an example of a fluid actuator or a load circuit, is connected to the output of the hydraulic transformer 152. A controller or control unit 164 is electrically connected to the hydraulic transformer 152 by an electrical lead 166. A pressure sensor 168 is connected between the output of the hydraulic transformer 152 and the motor 162 to sense the pressure being supplied to the motor 162. The sensor 168 is connected to the control unit 164 via a lead 170. The sensor 168 provides the sensed pressure to the control unit 164 over the lead 170. In this manner, the control unit 164 is able to monitor the output of the hydraulic transformer 152 to control the operation of the hydraulic transformer 152.

Although not shown, it is also possible to monitor the speed of any of the hydraulic transformers 12, 102, or 152, in order to control the operation of the hydraulic transformers 12, 102, or 152. In this manner, the speed of the hydraulic transformers 12, 102, or 152 is used as the controlled variable instead of the input pressure or the output pressure.

INDUSTRIAL APPLICABILITY

The control system 10 constructed in accordance with the teachings of the present invention advantageously improves the application of a hydraulic transformer by controlling the hydraulic transformer to satisfy the demands of all the hydraulic circuits or loads connected to the hydraulic transformer. The control system 10 of the present invention also reduces bleed down of an accumulator associated with a hydraulic system coupled to the hydraulic transformer. Bleed down is eliminated or reduced with the use of the control system 10 of the present invention. Since bleed down is a significant concern in the operation of a hydraulic transformer it is important to control the operation of the hydraulic transformer to ensure that standard system pressure is applied and that operations proceed in a normal manner. Additionally, the control system 10 is capable of eliminating any oscillations which are generated in the input and the output flow and pressure of the hydraulic transformer.

Other aspects, objects and advantages of the present invention can be obtained from a study of the drawings, the disclosure and the appended claims.

What is claimed is:

1. A control system for a hydraulic transformer for providing hydraulic pressure to a fluid actuator comprising a hydraulic system for providing hydraulic pressure to the hydraulic transformer, a controller connected to the hydraulic transformer, the controller for determining the input pressure provided to the hydraulic transformer and for controlling the operation of the hydraulic transformer based upon input pressure provided to the hydraulic transformer, the controller including at least one of a proportional control term unit, an integral control term unit and a derivative control term unit, the proportional control term unit being capable of determining a first power signal error between a reference power signal and the actual power signal being supplied to the input of the hydraulic transformer and of controlling a displacement ratio of the hydraulic transformer in a manner proportional to the first power signal error, the integral control term unit being capable of determining a second power signal error between a reference power signal and the actual power signal being supplied to the input of the hydraulic transformer and of ensuring a substantially zero steady state error in the actual power being supplied relative to the reference power signal, the derivative control term unit being capable of determining whether there are any oscillations at the input of the hydraulic transformer and of thereby actively substantially canceling any resultant oscillations within the hydraulic transformer.

2. The control system of claim 1 further comprising a pressure sensor connected between the hydraulic system and the hydraulic transformer, the sensor for sensing the pressure being provided from the hydraulic system to the hydraulic transformer, the sensor being connected to the controller for providing the controller with the sensed pressure.

3. The control system of claim 1 wherein the controller comprises a power reference computation unit which is capable of determining a reference pressure being provided to the hydraulic transformer.

4. The control system of claim 1 wherein the controller includes said proportional control term unit.

5. The control system of claim 1 wherein the controller includes said integral control term unit.

6. The control system of claim 1 wherein the controller includes said derivative control term unit.

7. The control system of claim 1 wherein the controller includes a power reference computation unit which is capable of determining a reference pressure being provided to the hydraulic transformer, the power reference computation unit being connected to said at least one of said proportional control term unit, said integral control term unit, and said derivative control term unit.

8. The control system of claim 1 wherein the hydraulic transformer comprises a rotatable port plate and the controller is capable of moving the port plate based upon the input pressure provided to the hydraulic transformer.

9. A control system for a hydraulic transformer comprising a hydraulic transformer for providing hydraulic pressure to a fluid actuator, a hydraulic system for providing hydraulic pressure to the hydraulic transformer, a controller connected to the hydraulic transformer, the controller for determining the output pressure provided to the fluid actuator from the hydraulic transformer and for controlling the operation of the hydraulic transformer based upon output pressure, the controller including at least one of a proportional control term unit, an integral control term unit and a derivative control term unit, the proportional control term unit being capable of determining a first power signal error between a reference power signal and the actual power signal being supplied to the fluid actuator and of controlling a displacement ratio of the hydraulic transformer in a manner proportional to the first power signal error, the integral control term unit being capable of determining a second power signal error between a reference power signal and the actual power signal being supplied to the fluid actuator and of ensuring a substantially zero steady state error in the actual power being supplied to the fluid actuator relative to the reference power signal, the derivative control term unit being capable of determining whether there are any oscillations at the output of the hydraulic transformer and of thereby actively substantially canceling any resultant oscillations within the hydraulic transformer.

10. The control system of claim 9 further comprising a pressure sensor connected between the hydraulic transformer and the fluid actuator, the sensor for sensing the pressure being provided from the hydraulic transformer to the fluid actuator, the sensor being connected to the controller for providing the controller with the sensed pressure.

11. The control system of claim 9 wherein the controller comprises a power reference computation unit which is capable of determining a reference pressure being provided to the fluid actuator.

12. The control system of claim 9 wherein the controller includes said proportional control term unit.

13. The control system of claim 9 wherein the controller includes said integral control term unit.

14. The control system of claim 9 wherein the controller includes said derivative control term unit.

15. The control system of claim 9 wherein the controller includes a power reference computation unit which is capable of determining a reference pressure being provided to the fluid actuator, the power reference computation unit being connected to said at least one of said proportional control term unit, said integral control term unit, and said derivative control term unit.

16. The control system of claim 9 wherein the hydraulic transformer comprises a movable port plate and the controller is capable of moving the port plate based on the output pressure.

* * * * *